United States Patent
Nuthalapati et al.

(10) Patent No.: US 10,855,570 B2
(45) Date of Patent: *Dec. 1, 2020

(54) SELECTIVELY FORWARDING FLOW OF PACKETS IN A NETWORK APPLIANCE

(71) Applicant: Gigamon Inc., Santa Clara, CA (US)

(72) Inventors: Ayyappa Nuthalapati, Santa Clara, CA (US); Bhanu Prathap Reddy Parlapalli, Danville, CA (US); Andrew Mao, Santa Clara, CA (US); Qi Ming Ng, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,856

(22) Filed: Sep. 6, 2018

(65) Prior Publication Data

US 2019/0020564 A1    Jan. 17, 2019

Related U.S. Application Data

(63) Continuation of application No. 15/358,096, filed on Nov. 21, 2016, now Pat. No. 10,103,963.

(51) Int. Cl.
| | |
|---|---|
| *H04L 12/26* | (2006.01) |
| *H04L 12/743* | (2013.01) |
| *H04L 12/851* | (2013.01) |
| *H04L 12/823* | (2013.01) |

(52) U.S. Cl.
CPC .......... *H04L 43/12* (2013.01); *H04L 43/026* (2013.01); *H04L 43/08* (2013.01); *H04L 43/0894* (2013.01); *H04L 45/7453* (2013.01); *H04L 47/2483* (2013.01); *H04L 47/32* (2013.01)

(58) Field of Classification Search
CPC ..... H04L 43/12; H04L 47/2483; H04L 47/32; H04L 43/0894; H04L 43/026; H04L 43/08; H04L 45/7453
See application file for complete search history.

(56) References Cited

U.S. PATENT DOCUMENTS

| | | | |
|---|---|---|---|
| 7,111,101 B1 | 9/2006 | Bourke et al. | |
| 7,424,018 B2 | 9/2008 | Gallatin et al. | |
| 7,436,832 B2* | 10/2008 | Gallatin | H04L 12/4645 370/389 |
| 7,440,467 B2* | 10/2008 | Gallatin | H04L 12/4645 370/249 |
| 7,835,358 B2 | 11/2010 | Gallatin et al. | |
| 7,889,748 B1 | 2/2011 | Leong et al. | |

(Continued)

*Primary Examiner* — Peter P Chau
(74) *Attorney, Agent, or Firm* — Perkins Coie LLP (57) ABSTRACT

A network appliance described herein allows the user to selectively forward the flow of packets received through a network port, to a particular egress port. The network appliance creates virtual ports, which can be assigned to the one or more egress ports. The network appliance assigns the flow of packets to the one or more virtual ports in the network appliance. The network appliance decides a forwarding treatment to be applied to the flow of packets, for forwarding the flow of packets to the egress tool ports, based on the virtual port to which the flow of packets is assigned and based on a detected network characteristic. The forwarding treatment can be a decision to drop the flow of packets, or to send the flow of packets to the egress port assigned to the virtual port.

21 Claims, 10 Drawing Sheets

(56) References Cited

U.S. PATENT DOCUMENTS

| | | |
|---|---|---|
| 2004/0120322 A1 | 6/2004 | Wu |
| 2009/0135835 A1 | 5/2009 | Gallatin et al. |
| 2013/0201984 A1 | 8/2013 | Wang |
| 2013/0258838 A1 | 10/2013 | Colven et al. |
| 2014/0229630 A1* | 8/2014 | Narayanan ............... H04L 45/38 709/238 |
| 2015/0169345 A1* | 6/2015 | DeCusatis ........... G06F 9/45545 718/1 |
| 2015/0207905 A1 | 7/2015 | Merchant et al. |

* cited by examiner

SELECTIVELY FORWARDING FLOW OF PACKETS IN A NETWORK APPLIANCE

CROSS-REFERENCE TO RELATED APPLICATIONS

This application claims priority to the U.S. patent application Ser. No. 15/358,096 filed Nov. 21, 2016, now U.S. Pat. No. 10,103,963, issued Oct. 16, 2018, which is incorporated herein by this reference in its entirety.

TECHNICAL FIELD

At least one embodiment of the present disclosure pertains to systems and techniques for managing the flow of packets in a network, and more specifically, to methods and systems that selectively forward the flow of packets from network ingress ports to egress ports of a network appliance.

BACKGROUND

A network appliance can be used as part of a network visibility solution to route data packets that are traversing a network to one or more external devices, or "tools." The external tools, which are attached to egress ports of the network appliance, can be used, for example, for intrusion detection, intrusion prevention, network diagnostics, etc. In some deployments it may be advantageous for such a network appliance to distribute incoming network packets to multiple egress ports of the network appliance. Currently, the distribution of incoming packets in such a network appliance is done automatically, with a user having only indirect, high-level control over which egress ports receive the incoming network packets.

Further, the incoming network packets may include inherent groupings, to which the network appliance is agnostic. Agnosticism of the packet groupings can result in less than optimal network traffic monitoring, intrusion prevention, network communication, etc.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

General System Overview

In this description, references to "an embodiment," "one embodiment," and the like, mean that the particular feature, function, structure, or characteristic being described is included in at least one embodiment introduced here. Occurrences of such phrases in this specification do not necessarily all refer to the same embodiment, nor are the embodiments referred to herein necessarily mutually exclusive.

Currently, the distribution of incoming packets across multiple egress ports in a network appliance is done automatically, with a user having only indirect, high-level control over which egress ports of the network receive the incoming network packets. Further, the incoming network packets may include inherent groupings, i.e., flow of packets, to which the network appliance is agnostic. A "flow" of packets is a grouping of packets based on one or more properties of the data packets, such as source address, destination address, an application associated with the packet, and application subscriber associated with the packet, etc. Agnosticism of the flow of packets results in less than optimal network traffic monitoring, intrusion prevention, network communication, etc.

The system described herein gives the user more control over the routing of the flow of incoming packets across egress ports of the network appliance, by giving the user the ability to define the flow of incoming packets. The system preserves the unity of the flow of incoming packets by sending the whole flow to a single egress port of the network appliance. The system may change the egress port while the flow of incoming packets is still being received. However, even after changing the egress port, all the packets in the flow of incoming packets are sent to the new egress port, and are not distributed across two egress sports. Further, to preserve network efficiency, the system decides to which egress port to send the flow of packets, based on various network characteristics.

A network appliance can be a node in a computer network and can be configured to receive a flow of packets from one or more other nodes within the computer network. The network appliance receives the flow of packets through a network port that coupled the network appliance to the rest of computer network. The network appliance includes egress ports. The network appliance also includes one or more processors.

The processor creates virtual ports in the network appliance. The processor can statically or dynamically assign the virtual ports to the one or more egress ports. The processor assigns the flow of packets to the virtual ports in the network appliance. The processor decides a forwarding treatment to be applied to the flow of packets, for forwarding the flow of packets to the egress tool ports, based on the virtual port to which the flow of packets is assigned and based on a detected network characteristic. The forwarding treatment can be a decision to drop the flow of packets or to send the flow of packets to the egress port assigned to the virtual port.

Selective Forwarding of a Flow of Packets

Figure 1:
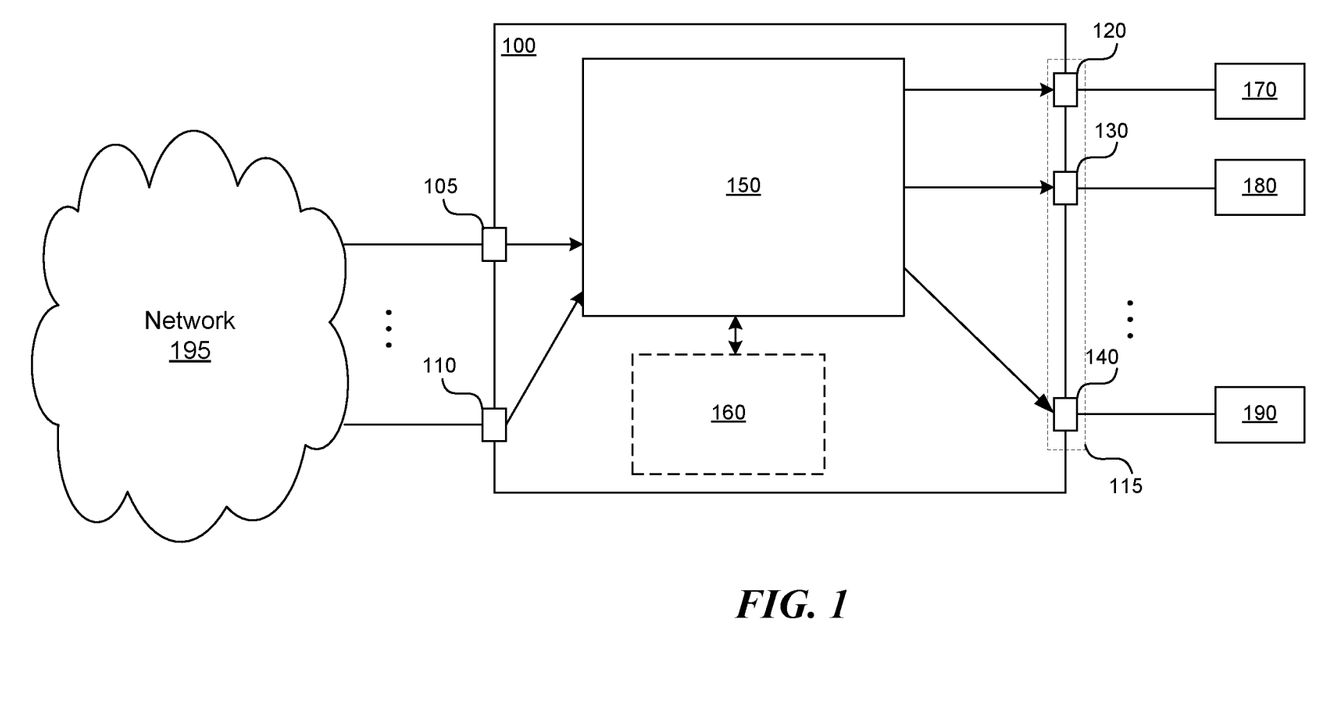
FIG. 1 shows a network appliance to selectively forward the flow of packets to egress tool ports, according to one embodiment.

FIG. 1 shows a network appliance to selectively forward the flow of packets to egress tool ports, according to one embodiment. The network appliance 100 includes two network ports 105, 110, three egress tool ports 120, 130, 140, a processor 150, and an optional memory 160, all of which communicate with each other using a bus denoted by arrows in FIG. 1. In other embodiments, the network appliance 100 can include essentially any number of network ports, tool ports, and/or processors. The memory 160 can store the received flow of packets from the network ports 105, 110 and send the flow of packets to the processor 150.

The network appliance 100 can be in-line or out-of-band with respect to the network 195. Out-of-band devices operate outside of the path of data traffic between a sending endpoint node and a receiving endpoint node and receive copies of the data packets that make up the data traffic, rather than the original data packets. Out-of-band devices are able to freely modify the copies of the data packets because the original data packets are allowed to traverse the network 195 unimpeded. In-line devices, on the other hand, operate within the path of data traffic between a sending endpoint node and a receiving endpoint node and receive and forward the original data packets.

The network ports 105, 110 of the network appliance 100 each can receive a flow of packets from the network 195. The network 195 can be a data network, a wireless network, a telephony network, or any combination thereof. The data network may be, for example, a local area network (LAN), metropolitan area network (MAN), wide area network (WAN), a public data network (e.g., the Internet), short range wireless network, or any other suitable packet-switched network, such as a commercially owned, proprietary packet-switched network (e.g., a proprietary cable or fiber-optic network, and the like, or any combination thereof). In addition, the wireless network may be, for example, a cellular network and may employ various technologies including enhanced data rates for global evolution (EDGE), general packet radio service (GPRS), global system for mobile communications (GSM), internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, 5th Generation cellular network, code division multiple access (CDMA), wideband code division multiple access (WCDMA), wireless fidelity (WiFi), wireless LAN (WLAN), Bluetooth®, Internet Protocol (IP), data casting, satellite, mobile ad-hoc network (MANET), and the like, or any combination thereof.

The egress tool ports 120, 130, 140 receive the flow of packets and output the flow of packets to network monitoring tools 170, 180, 190. When the network appliance 100 is in-line, the network monitoring tools 170, 180, 190, after inspecting the flow of packets, forward the flow of packets back to the network appliance 100, which, in turn sends the flow of packets back to the network 195. The egress tool ports 120, 130, 140 can be grouped together in a logical group called a trunk 115.

The processor 150 receives the flow of packets from the network ports 105, 110. The processor 150 creates virtual ports in the network appliance 100 either before or after receiving the flow of packets from the network ports 105, 110. The processor 150 assigns the flow of packets to one virtual port in the network appliance 100. Finally, the processor 150 decides a forwarding treatment to be applied to the flow of packets for forwarding the flow of packets to the egress tool ports 120, 130, 140 of the network appliance 100 based on the virtual port to which the flow of packets is assigned and based on a detected network characteristic. The forwarding treatment can be a decision to drop the flow of packets or to send the flow of packets to a particular egress port. The egress port can be a tool port, or a network egress port.

For example, the detected network characteristic can be an operational status of the egress tool ports, such as whether the egress port has failed. If the egress port has failed, the processor 150 decides that the forwarding treatment is to drop the received flow of packets. In another example, the detected network characteristic can be a network bandwidth associated with an egress tool port 120 and a network traffic flowing through the egress tool port 120. As a more specific example, if the network traffic flowing through the egress tool port 120 is below 95% of the network bandwidth of the egress tool port 120, the processor can assign a virtual port to the egress tool port 120 and send the flow of packets to the egress port 120. Alternatively, the processor 150 can measure that the egress tool port 140 is the least-subscribed tool port in the egress tool ports 120, 130, 140. Based on that measurement, the processor 150 can decide that the forwarding treatment is to assign the virtual port to the egress tool port 140 and to send the flow of packets to egress tool port 140.

Figure 2:
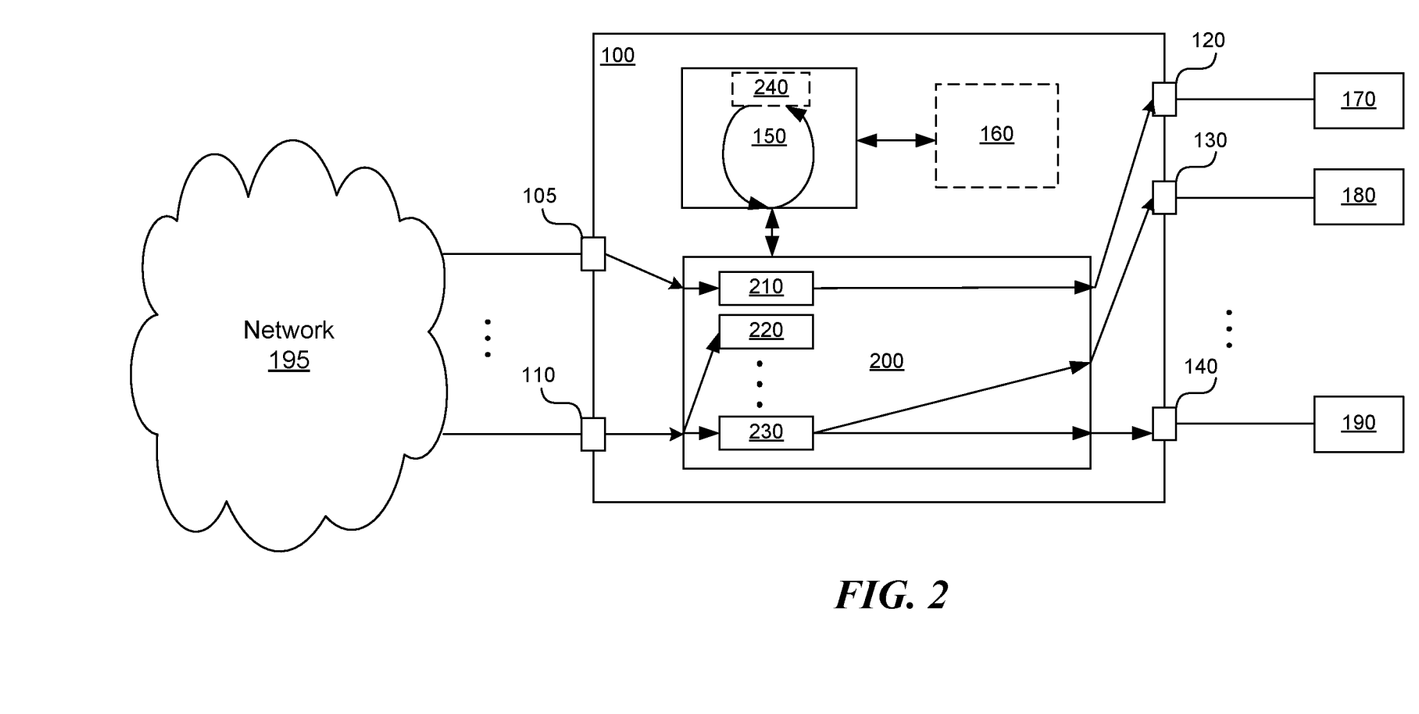
FIG. 2 shows a network appliance to selectively forward the flow of packets to egress tool ports, according to another embodiment.

FIG. 2 shows a network appliance to selectively forward the flow of packets to egress tool ports, according to another embodiment. The network appliance creates virtual ports to selectively forward the flow of incoming packets from the network ports 105, 110 to egress tool ports 120, 130, 140. The network appliance utilizes switching fabric 200 for forwarding the flow of incoming packets.

The network appliance 100 includes network ports 105, 110, egress tool ports 120, 130, 140, at least one processor 150, an optional memory 160, a switching fabric 200, and virtual ports 210, 220, 230, all of which communicate with each other using a bus denoted by arrows in FIG. 2. The switching fabric 200 forwards the flow of packets from the network ports 105, 110 to the egress tool ports 120, 130, 140, via the virtual ports 210, 220, 230. The virtual ports 210, 220, 230 can be associated with the switching fabric 200, as shown in FIG. 2. Alternatively, the virtual ports 210, 220, 230 can be associated with the optional memory 160.

The processor 150 establishes a correspondence between the network ports 105, 110, the virtual ports 210, 220, 230, and the egress tool ports 120, 130, 140. The correspondence between the network ports 105, 110 and the virtual ports 210, 220, 230 can be one-to-one, one-to-many, many-to-one, many-to-many. A network port in the network ports 105, 110 can have no mapping to any of the virtual ports 210, 220, 230. Conversely, a virtual port 210, 220, 230 can have no mapping to any of the network ports 105, 110. The correspondence between the virtual ports 210, 220, 230 and the egress tool ports 120, 130, 140 can be one-to-one, one-to-many, many-to-one, many-to-many. A virtual port 210, 220, 230 may not necessarily have a mapping to any of the egress tool ports 120, 130, 140. Conversely, an egress tool port 120, 130, 140 may not necessarily have a mapping to any of the virtual ports 210, 220, 230. Regardless of the type of correspondence between the virtual ports 210, 220, 230 and the egress tool ports 120, 130, 140, one flow of packets associated with a virtual port 210, 220, 230 is mapped to either one egress tool port 120, 130, 140 or no egress tool ports.

The correspondence between the network ports 105, 110 and the virtual ports 210, 220, 230 can be static or dynamic.

Similarly, the correspondence between the virtual ports 210, 220, 230 and the egress tool ports 120, 130, 140 can be static or dynamic.

For example, when the correspondence between the virtual ports 210, 220, 230 and the egress tool ports 120, 130, 140 is static, if an egress port 130 fails and cannot forward any flow of incoming packets, the flow of packets coming from virtual port 230 is not mapped to any other egress tool ports. The flow of packets can be dropped or can be returned to the network 195.

In another example, when the correspondence is dynamic, the processor 150 can run an adaptive algorithm 240. The adaptive algorithm 240 can dynamically adjust the correspondence between the virtual ports 210, 220, 230 and the egress tool ports 120, 130, 140 based on various network characteristics. As a more specific example, if the egress tool port 120 fails and cannot forward any flow of packets, the optional adaptive algorithm 240 can stop forwarding any flow of packets coming through the virtual port 210. Alternatively, the optional adaptive algorithm 240 can map the virtual port 210 to an operating egress port, such as the egress ports 130, 140.

Figure 3:
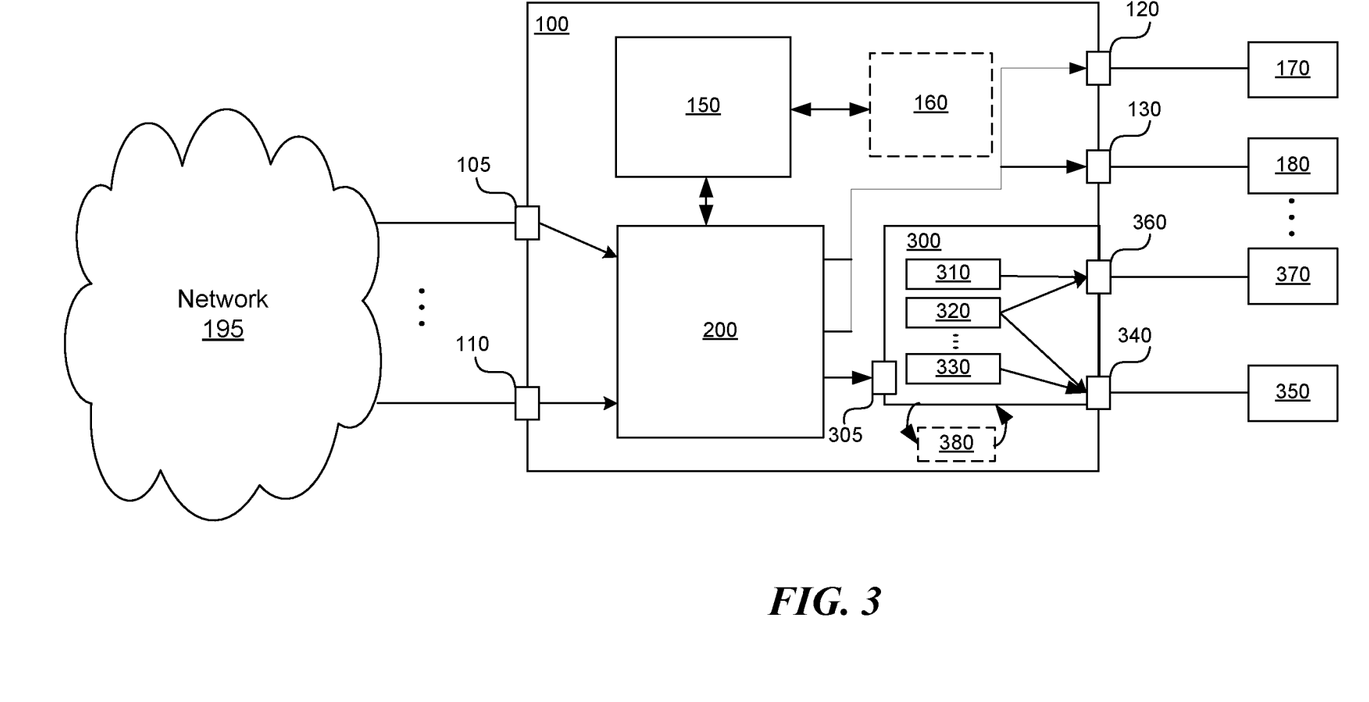
FIG. 3 shows a module within a network appliance to selectively forward the flow of packets to egress tool ports.

FIG. 3 shows a module within a network appliance to selectively forward the flow of packets to egress tool ports. The module 300 creates virtual ports to selectively forward the flow of incoming packets from the network ports 305 to egress tool ports 340, 360. The module receives the flow of incoming packets from a switching fabric 200 within the network appliance 100.

The module 300 includes network ports 305, a bundled group of egress tool ports 340, 360, called a trunk, and virtual ports 310, 320, 330. The bundled group of egress tool ports 340, 360 is connected to network monitoring instruments 350, 370, respectively. The module 300 receives the flow of packets from the switching fabric 200 outside the module through the network ports 305. The module 300 establishes a correspondence between the flow of packets and the egress tool ports 340, 360, via virtual ports 310, 320, 330, based on a network characteristics. The correspondence between the virtual ports 310, 320, 330 and the egress tool ports 340, 360 can be one-to-one, many-to-one, many-to-many, and one-to-many. Regardless of the type of correspondence, one flow of packets is mapped to either one egress tool port 340, 360, or no egress tool ports. The correspondence can be static or dynamic.

When the correspondence is static, if an egress tool port fails, such as egress tool port 340, the flow of packets between the virtual ports 320, 330 and the egress tool port 340 does not get remapped to egress tool port 360. Instead, the flow of packets is either dropped, or sent back to the network 195 when the network appliance 100 is in-line.

When the correspondence is dynamic, an adaptive algorithm 380 can run on a processor associated with the module 300 or on the processor 150. The adaptive algorithm 380 can establish a dynamic correspondence between the virtual ports 310, 320, 330 and the egress tool ports 340, 360. For example, if the egress tool port 360 fails, the adaptive algorithm 380 can remap the flow of packets from virtual port 310, 320 to the egress tool port 340.

Based on the network characteristics, and the correspondence between the virtual ports 310, 320, 330 and the egress tool ports 340, the module 300 decides a forwarding treatment to apply to the flow of packets.

Figure 4:
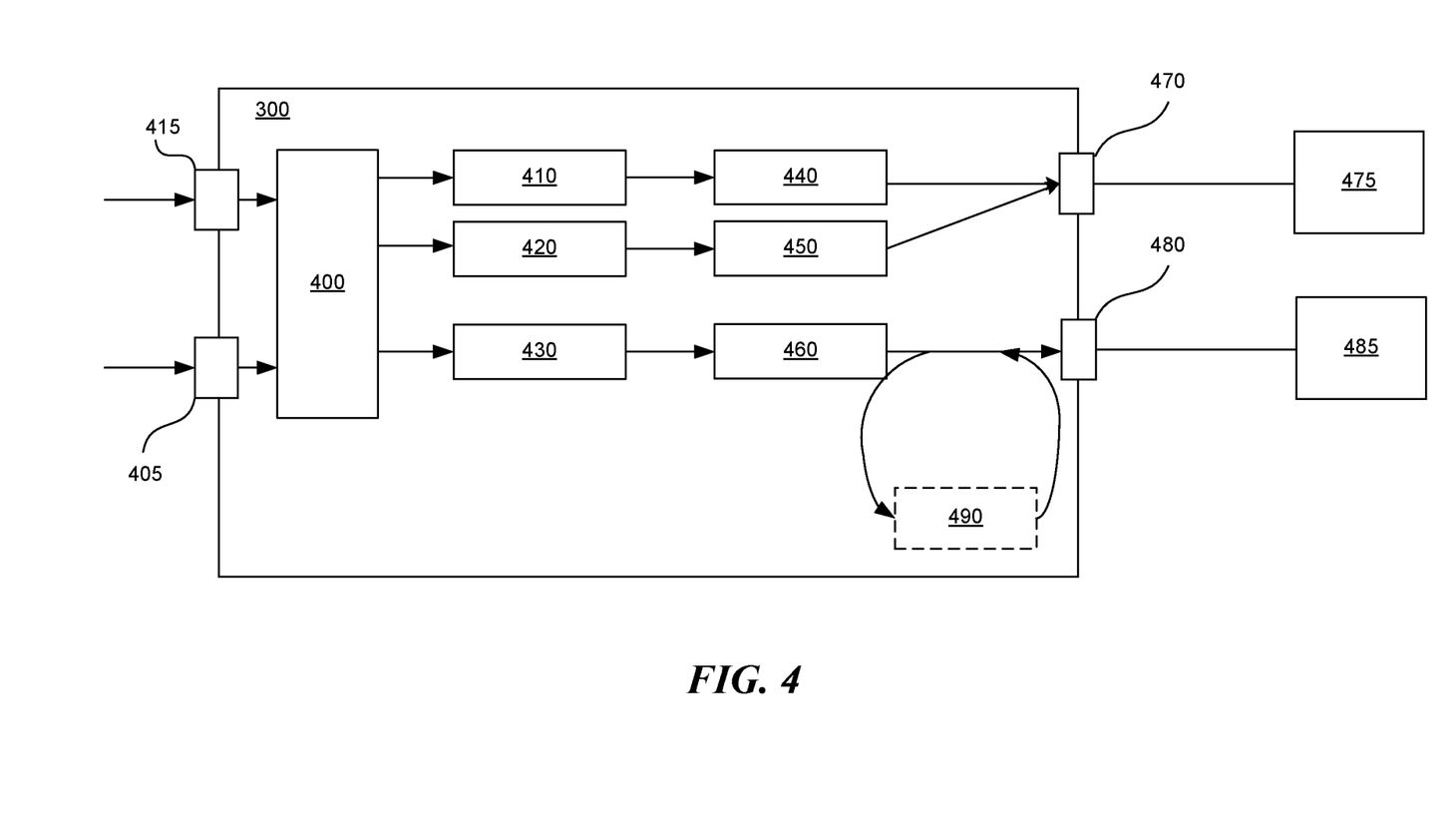
FIG. 4 shows an internal structure of the module within the network appliance.

FIG. 4 shows an internal structure of the module within the network appliance. The module 300 combines the flows of packets received from network ports 405, 415 into a single stream 400. The single stream 400 is distributed into hash buckets 410, 420, 430. A hash bucket is a logical container used to group the flow of packets. One flow of packets is distributed to one hash bucket 410, 420, 430. Sometimes multiple flows of packets can be distributed to one hash bucket 410, 420, 430. One hash bucket 410, 420, 430 corresponds to one virtual port 440, 450, 460.

The virtual ports 440, 450, 460 are mapped to egress tool ports 470, 480. The egress tool ports 470, 480 are connected to network monitoring instruments 475, 485. An optional adaptive algorithm 490 running on a processor associated with the module 300 can dynamically adjust the mapping between the virtual ports 440, 450, 460 and egress tool ports 470, 480.

Figure 5A:
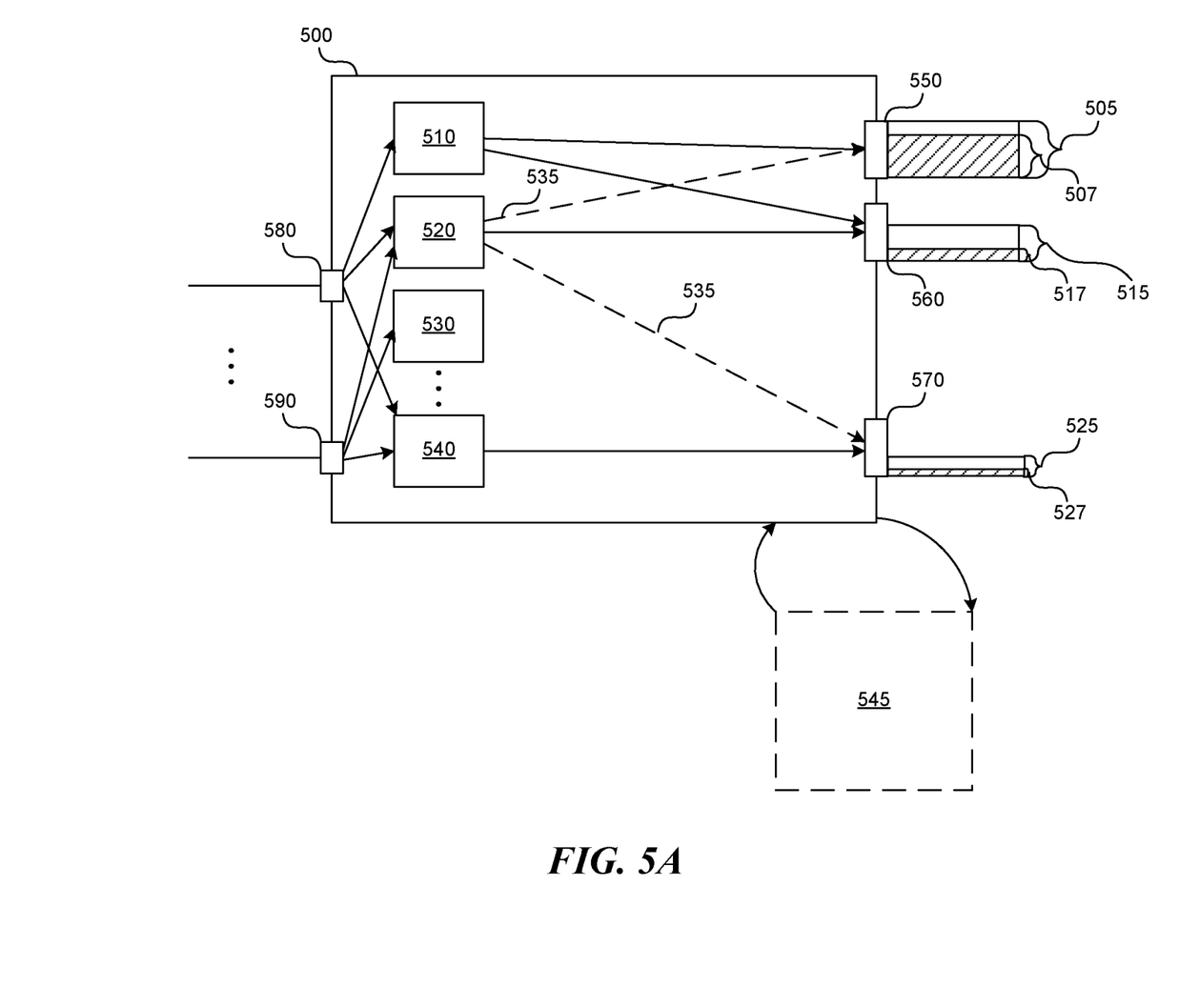
FIG. 5A shows how the correspondence between the virtual ports and the egress tool ports is established, based on a network characteristic, according to one embodiment.

FIG. 5A shows how the correspondence between the virtual ports and the egress tool ports is established, based on a network characteristic, according to one embodiment. Module 500 contains virtual ports 510, 520, 530, 540, egress ports 550, 560, 570, and network ports 580, 590. Module 500 can be the network appliance 100 of FIG. 1, or can be the module 300 within the network appliance of FIG. 3.

Each egress port 550, 560, 570 has a corresponding network bandwidth 505, 515, 525, respectively. Larger network bandwidth is represented with a wider rectangle in FIG. 5. As seen in FIG. 5, the largest network bandwidth 505 is associated with egress port 550, the second largest network bandwidth 515 is associated with egress port 560, and the smallest network bandwidth 525 is associated with egress port 570. The shaded part of the of the network bandwidth 505, 515, 525, represents network traffic 507, 517, 527 flowing through the egress ports 550, 560, 570. As seen in FIG. 5, egress port 550 has the most network traffic 507, egress port 560, has the second most network traffic 517, and egress port 570 has the least network traffic 527. In establishing the correspondence 535, between the virtual port 520 and the egress port 570, the module 500 and/or a processor associated with the module 500 considers the network characteristics.

For example, the detected network characteristic can be a network bandwidth associated with an egress port 550, 560, 570 and/or a network traffic 507, 517, 527 flowing through the egress ports 550, 560, 570. Based on the network bandwidth 505, 515, 525, and the network traffic 507, 517, 527 associated with the egress ports 550, 560, 570, the processor determines that the least-subscribed egress port is egress port 570. The processor then establishes the correspondence 535 between the virtual port 520, and the egress port 570. Alternatively, the processor can only consider the network bandwidth 505, 515, 525, and assign the correspondence 535 to the egress port 550. The processor can establish the correspondence 535 statically or dynamically as described herein. The dynamic correspondence can be established by an adaptive algorithm 545, which can run inside the module 500, or on a processor outside the module 500.

Figure 5B:
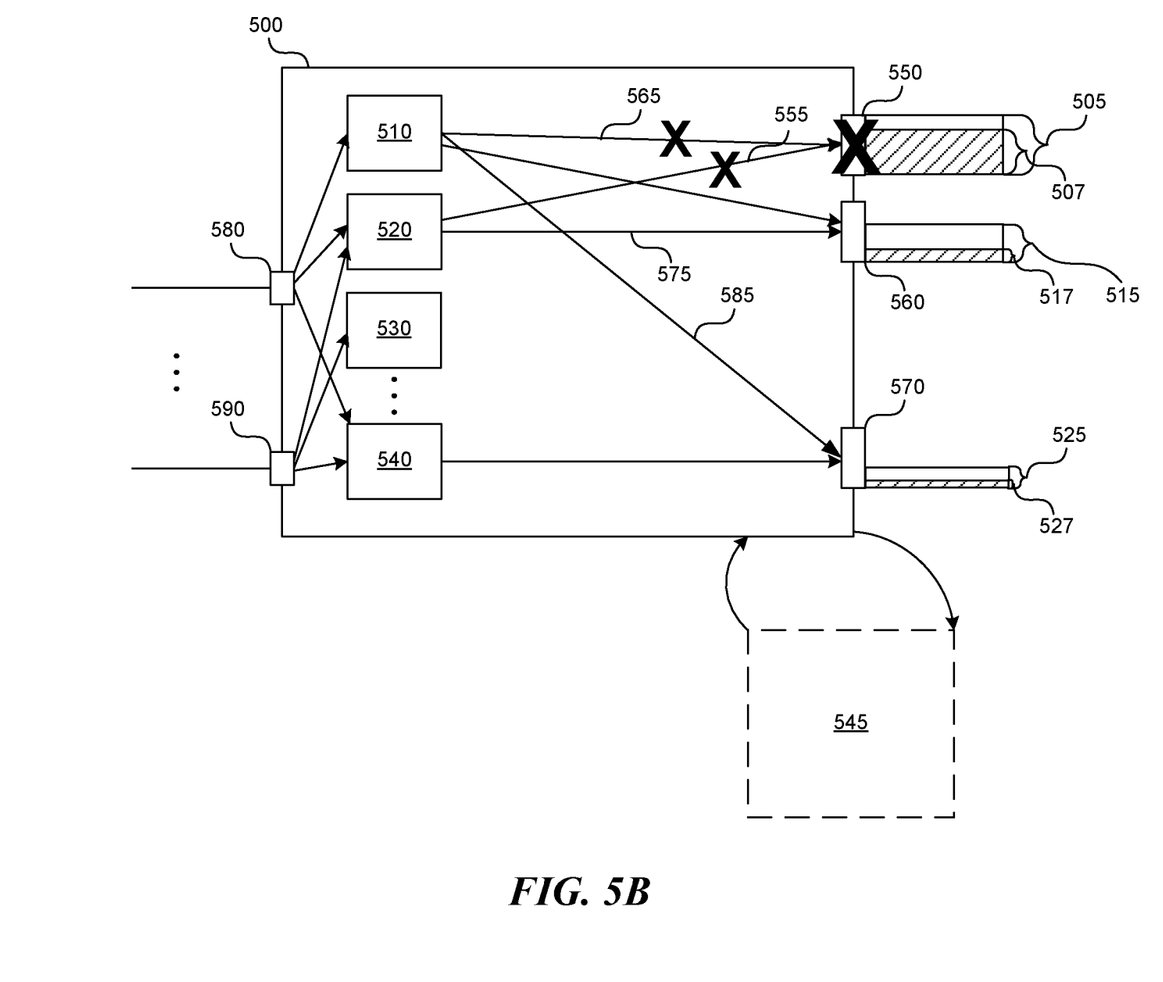
FIG. 5B shows how the correspondence between the virtual ports and the egress tool ports is established, based on a network characteristic, according to another embodiment.

FIG. 5B shows how the correspondence between the virtual ports and the egress tool ports is established, based on a network characteristic, according to another embodiment. The detected network characteristic can be an operational status of the egress ports 550, 560, 570, such as whether the egress port has failed. For example, the egress port 550 can fail, such as the egress port itself can fail, the connection to an instrument connected to the egress port 550 can fail, and/or the instrument connected to the port 550 can fail. When the correspondence 555, 565 is static, the processor can decide to drop the flows of packets associated with the correspondence 555, 565. When the correspondence 555, 565 is static, the processor can also decide to route the flows of packets associated with the correspondence 555, 565 back to the network. When the correspondence 555, 565 is a dynamic, the correspondence 555, 565 is adjustable by the optional adaptive algorithm 545. In the dynamic scenario, the processor can still decide to drop the flows of packets associated with the correspondence 555, 565. Alternatively, in the dynamic scenario, the processor can map the correspondence 555, 565 to the egress ports 560, 570, to obtain new correspondences 575, 585, respectively.

Figure 6:
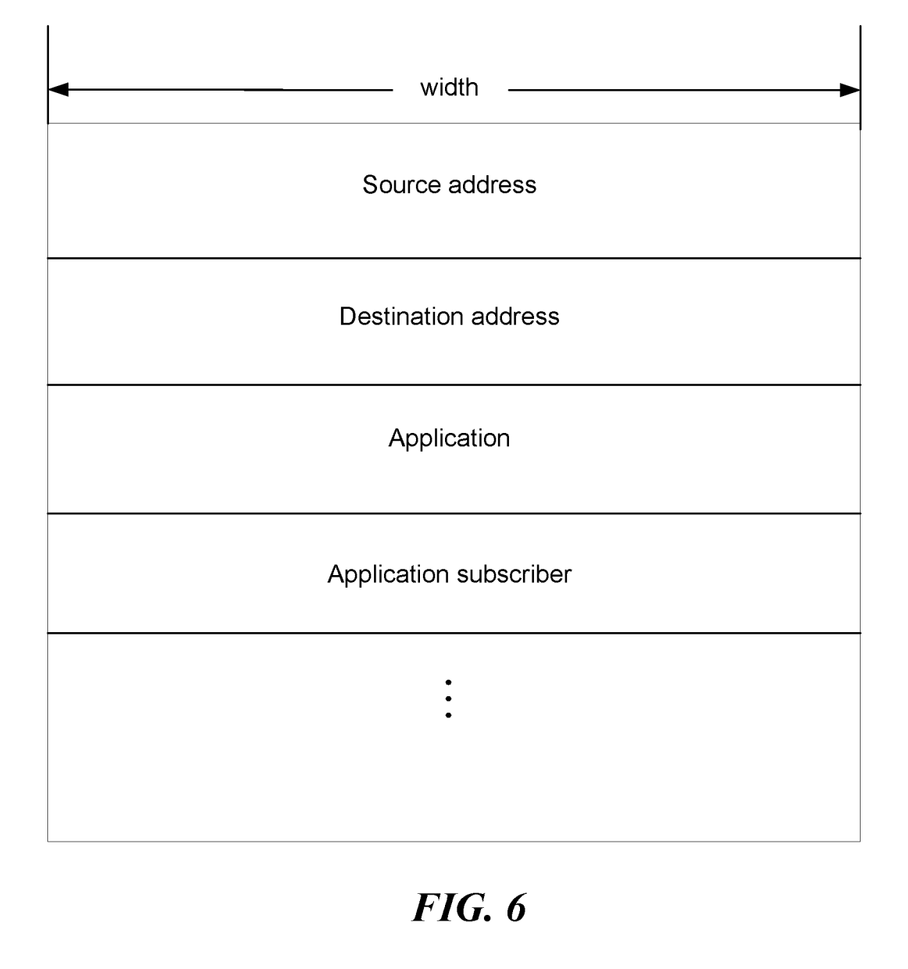
FIG. 6 shows multiple properties of a packet in a flow of packets.

FIG. 6 shows multiple properties of a packet in a flow of packets. Each packet in the flow of packets contains properties such as source address, destination address, an application associated with the packet, an application subscriber associated with the packet, etc. The properties can be part of the packet header or part of the packet data section. The properties can be one or more values contained in the header or one or more values contained in the packet data section. The source address can include an internet protocol (IP) address of the packet source and/or a source port of the packet. The destination address can include an IP address of the packet destination, and/or a destination port of the packet. The width of the packet can be 16 bits, 32 bits, 64 bits, or any other power of two number of bits.

A flow of packets is a grouping of packets based on properties of the data packets. A flow of packets can be defined by the user or can be defined automatically. For example, a flow of packets can be a group of packets that has the same source address and the same destination address. A flow of packets can be a group of packets that have the same application subscriber. A flow of packets can be a group of packets that have an application belonging to a specified list of applications, such as Netflix, Pandora, and Amazon. In other words, all packets whose application field is Netflix, Pandora, and/or Amazon, are grouped into a single flow of packets.

Figure 7:
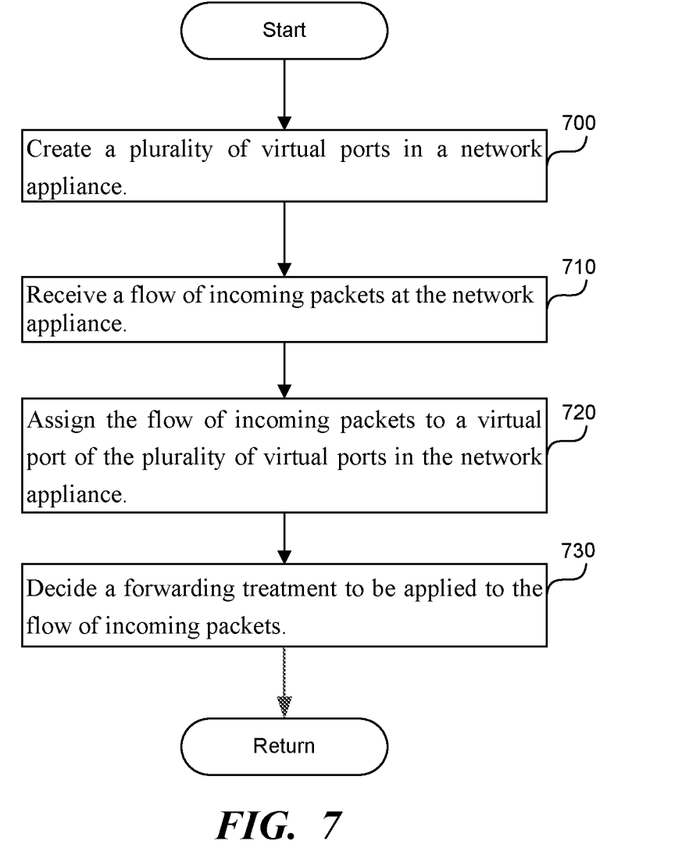
FIG. 7 shows a process of transmitting a flow of incoming packets to an egress port of a network appliance via virtual ports, according to one embodiment.

FIG. 7 shows a process of transmitting a flow of incoming packets to an egress port of a network appliance via virtual ports, according to one embodiment. In step 700, a processor creates the virtual ports in the network appliance. To create the virtual ports, the processor generates hash buckets. A hash bucket is associated with the flow of incoming packets. The processor then creates the virtual ports, where one virtual port can correspond to one hash bucket. The processor assigns the flow of incoming packets associated with the hash bucket to the virtual port corresponding to the hash bucket. Finally, the processor maps the virtual port to the egress port of the network appliance. The mapping between the virtual port and the egress port can be one-to-one, many-to-one, many-to-many, or one-to-many.

In step 710, the processor receives a flow of incoming packets at the network appliance. In step 720, the processor assigns the flow of incoming packets to a virtual port in the network appliance.

In step 730, the processor decides a forwarding treatment to be applied to the flow of incoming packets. The processor decides the forwarding treatment based on the virtual port to which the flow of incoming packets is assigned and based on a detected network characteristic. The detected network characteristic can be the following: network bandwidth, network traffic, an operational status of the egress port (such as whether an egress port has failed), maximum capacity of the egress port, current network traffic of the egress port, anticipated network traffic of the egress port, etc.

Based on the forwarding treatment, the processor can drop the flow of incoming packets. Similarly, based on the forwarding treatment, the processor can send the flow of incoming packets to an egress port of the network appliance. The egress port can be a tool port of the network appliance, a network monitoring instrument port, a destination port associated with the flow of incoming packets, etc.

The virtual port can be mapped to one or more egress ports. The mapping between the virtual port and the egress ports can be static or can be dynamic. When the mapping is static, once the processor decides the forwarding treatment to be applied to the flow of incoming packets, the processor sends the flow of incoming packets to an egress port associated with the virtual port. As described herein, the flow of incoming packets can be sent to a single egress port. If the egress port fails, the packets can be dropped, or the packets can be sent back to the network. When the mapping is dynamic, the processor can dynamically map the virtual port to the egress port, based on a network bandwidth associated with the egress port and a network traffic associated with the egress port. For example, when the egress port fails, instead of dropping the packets or sending them back to the network, the processor can map the virtual port to an egress port that is still functioning and has the bandwidth to handle additional traffic.

In addition, the processor can define the flow of incoming packets. The processor receives packets from a network ingress port of the network appliance. Each packet includes one or more properties, such as a source address, a destination address, an application associated with the packet, and an application subscriber associated with the packet, etc., as described herein. The processor receives from a user a criterion. The criterion includes a property and/or a value associated with the property. Based on the criterion, the processor defines the flow of incoming packets. Alternatively, the processor can automatically define the flow of packets. For example, the processor can define the flow of packets as packets that have the same source IP address, source port, destination IP address, and destination port.

For example, the criterion received from the user can specify that: all packets that have the same application should be grouped in a single flow; all packets that have application "Netflix" should be grouped in a single flow; all packets that have the same application and the same application subscriber should be group in a single flow; etc.

Figure 8:
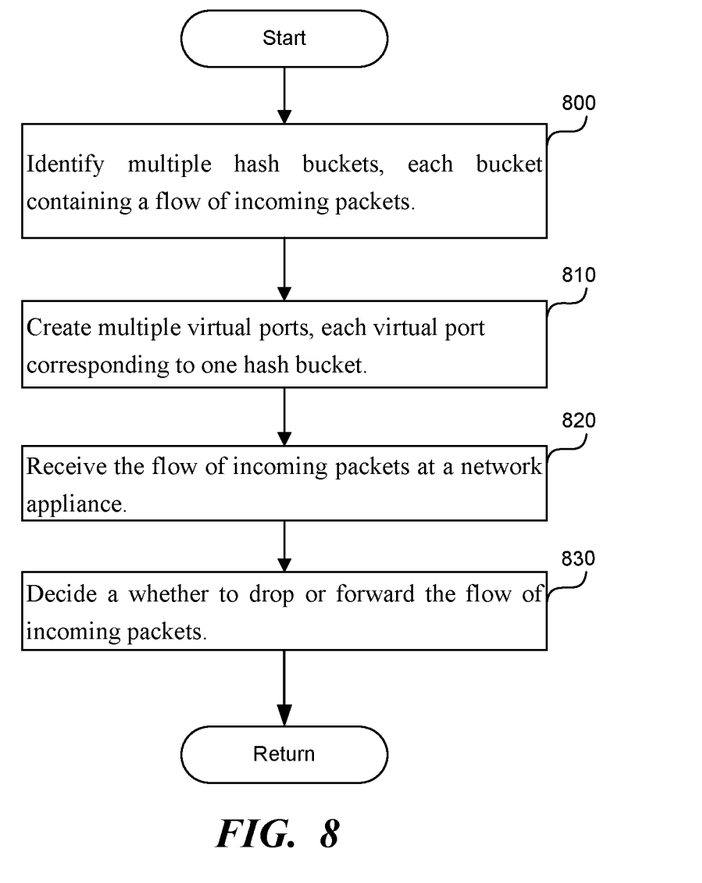
FIG. 8 shows a process of transmitting a flow of incoming packets to an egress port of a network appliance via virtual ports, according to another embodiment.

FIG. 8 shows a process of transmitting a flow of incoming packets to an egress port of a network appliance via virtual ports, according to another embodiment. In step 800, a processor identifies hash buckets. A hash bucket is associated with a flow of incoming packets. In identifying the hash buckets, the processor can create the hash buckets or can obtain the already created hash buckets from memory.

In step 810, the processor creates virtual ports. Each virtual port corresponds to one hash bucket. In step 820, the processor receives the flow of incoming packets at a network appliance.

In step 830, the processor decides a forwarding treatment to be applied to the flow of incoming packets. The processor decides the forwarding treatment based on the virtual port to which the flow of incoming packets is assigned and based on a detected network characteristic. The detected network characteristic can be the following: network bandwidth, network traffic, an operational status of the egress port (such as whether an egress port has failed), maximum capacity of the egress port, current network traffic of the egress port, anticipated network traffic of the egress port, etc.

Based on the forwarding treatment, the processor can drop the flow of incoming packets. Similarly, based on the forwarding treatment, the processor can send the flow of incoming packets to an egress port of the network appliance. The egress port can be a tool port of the network appliance, a network monitoring instrument port, a destination port associated with the flow of incoming packets, etc.

The virtual port can be mapped to one or more egress ports. The mapping between the virtual port and the egress ports can be static or can be dynamic. When the mapping is static, once the processor decides the forwarding treatment to be applied to the flow of incoming packets, the processor sends the flow of incoming packets to an egress port associated with the virtual port. As described herein, the flow of incoming packets can be sent to a single egress port. If the egress port fails, the packets can be dropped or the packets can be sent back to the network. When the mapping is dynamic, the processor can dynamically map the virtual port to the egress port, based on a network bandwidth associated with the egress port and a network traffic associated with the egress port. For example, when the egress port fails, instead of dropping the packets or sending them back to the network, the processor can map the virtual port to an egress port that is still functioning, has the bandwidth to handle additional traffic, and is operating at the least capacity compared to the remaining egress ports.

In addition, the processor can define the flow of incoming packets. The processor receives packets from a network ingress port of the network appliance. Each packet includes two or more properties, a source address, a destination address, an application associated with the packet, and an application subscriber associated with the packet, etc., as described herein.

The processor receives from a user a criterion. The criterion includes a property and/or a value associated with the property. Based on the criterion, the processor defines the flow of incoming packets. For example, the criterion received from the user can specify a value for the destination address associated with the packet, such as "Google". Based on the criterion, all the packets associated with Google are then grouped into a single flow. In another example, the criterion received from the user can specify source address and destination address, without specifying the value. Based on the criterion, all the packets with identical stores and destination addresses are grouped into a single flow.

Alternatively, the processor can automatically define the flow of packets, without receiving the criterion from the user. For example, the processor can define the flow of packets as packets that have the same application subscriber.

Processing System

Figure 9:
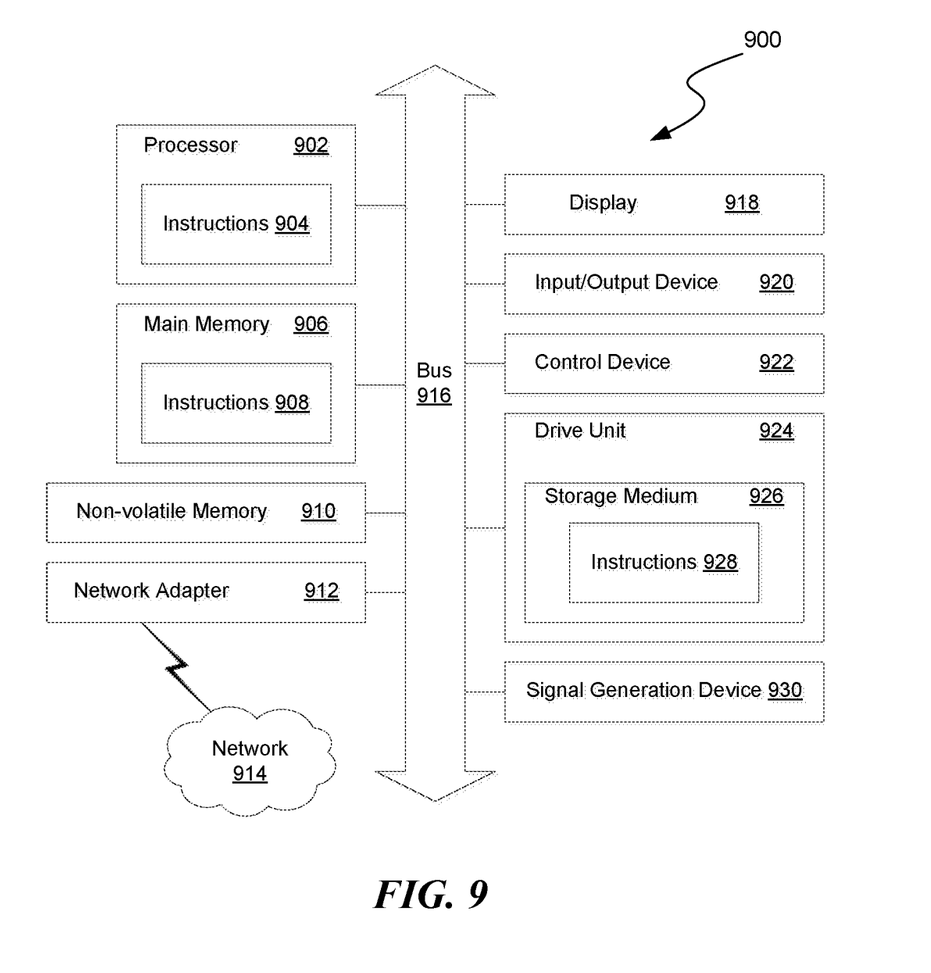
FIG. 9 is a block diagram illustrating an example of a processing system in which at least some operations described herein can be implemented.

FIG. 9 is a block diagram illustrating an example of a processing system 900 in which at least some operations, described herein, can be implemented. The processing system 900 can represent the network appliance itself, or can represent part of the network appliance, such as a module within the network appliance. For example, the processing system 900 may be responsible for creating the virtual ports through which the flow of incoming packets passes on the way to an egress port. As another example, at least a portion of the processing system 900 may be included in a network appliance (in that case, the processing system 900 may not include a display 918, but could instead include a switching fabric and tool port(s)). Further, the processor 902 can run the adaptive algorithm to dynamically map the virtual ports to the egress ports. The computing system may include one or more central processing units ("processors") 902, main memory 906, non-volatile memory 910, network adapter 912 (e.g., network interfaces), display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents any one or more separate physical buses, point to point connections, or both connected by appropriate bridges, adapters, or controllers. The bus 916, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 900 operates as a standalone device, although the processing system 900 may be connected (e.g., wired or wirelessly) to other machines. For example, the processing system 900 may include a terminal that is coupled directly to a network appliance. As another example, the computing system 900 may be wirelessly coupled to the network appliance.

In various embodiments, the processing system 900 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 906, non-volatile memory 910, and storage medium 926 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 928. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 904, 908, 928) set at various times in various memory and storage devices in a computer, and that when read and executed by one or more processing units or processors 902, cause the processing system 900 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 910, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 912 enables the processing system 900 to mediate data in a network 914 with an entity that is external to the processing system 900, such as a network appliance, through any known and/or convenient communications protocol supported by the processing system 900 and the external entity. The network adapter 912 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 912 can include a firewall which can, in some embodiments, govern and/or manage permission to access/proxy data in a computer network and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. An apparatus comprising:
   a network port through which to receive a flow of packets from a source external to the apparatus;
   a plurality of egress tool ports through which to output the flow of packets from the apparatus to a tool external to the apparatus; and
   a processor configured to:
   create a plurality of virtual ports in the apparatus;
   preserve a unity of the flow of packets by:
   assigning each packet in the flow of packets to the same virtual port of the plurality of virtual ports in the apparatus; and
   maintaining the unity of the flow of packets by deciding a same forwarding treatment to be applied to each packet in the flow of packets, wherein the deciding includes choosing between dropping the flow of packets and forwarding the flow of packets to an egress tool port of the apparatus, based on the virtual port to which the flow of packets is assigned and based on a detected network characteristic including a state of the egress tool port.

2. The apparatus of claim 1, wherein the apparatus is a module within a network appliance, the module including a bundled group of tool ports, the module configured to receive the flow of packets from a switching fabric outside the module but within the network appliance.

3. The apparatus of claim 2, the module to generate a plurality of hash buckets, wherein a hash bucket in the plurality of hash buckets is associated with the flow of packets, and wherein one hash bucket corresponds to one virtual port in the plurality of virtual ports.

4. The apparatus of claim 1, wherein the apparatus is a network appliance that includes a switching fabric to forward the flow of packets from the network port to the egress tool port.

5. The apparatus of claim 1, wherein the processor is configured to:
   receive a plurality of packets from the network port of the apparatus, wherein each packet in the plurality of packets includes a plurality of properties;
   receive from a user a criterion that includes a property of the plurality of properties; and
   based on the criterion, define the flow of packets from the plurality of packets.

6. The apparatus of claim 5, wherein the property includes an indication of an application associated with a packet in the plurality of packets.

7. The apparatus of claim 1, wherein the processor is further configured to:
   store the received flow of packets from the network port, wherein each packet in the flow of packets includes a plurality of properties; and
   store a criterion received from a user, wherein the criterion includes a property in the plurality of properties and a value associated with the property.

8. The apparatus of claim 1, the detected network characteristic including an operational status of the plurality of egress tool ports.

9. The apparatus of claim 1, the processor to decide the same forwarding treatment to be applied to each packet in the flow of packets by dynamically mapping the virtual port to which the flow of packets is assigned to the egress tool port, based on a network bandwidth associated with the egress tool port and a network traffic associated with the egress tool port.

10. A method comprising:
    creating a plurality of virtual ports in a network appliance;
    receiving a flow of incoming packets at the network appliance;
    preserving a unity of the flow of incoming packets by:
    sending the flow of incoming packets to the same virtual port of the plurality of virtual ports in the network appliance; and
    maintaining the unity of the flow of incoming packets by deciding, by the network appliance, a same forwarding treatment to be applied to each packet in the flow of incoming packets, wherein the deciding includes choosing between dropping the flow of incoming packets and forwarding the flow of incoming packets to an egress port of the network appliance, based on the virtual port to which the flow of incoming packets is sent and based on a detected network characteristic including a state of the egress port.

11. The method of claim 10, wherein the egress port is a tool port of the network appliance.

12. The method of claim 11, wherein the tool port is connected to a network monitoring instrument.

13. The method of claim 10, wherein the egress port is a destination port associated with the flow of incoming packets.

14. The method of claim 10, comprising:
receiving a plurality of packets from a network ingress port of the network appliance, wherein each packet in the plurality of packets includes a plurality of properties;
receiving from a user a criterion, wherein the criterion includes a property in the plurality of properties and a value associated with the property; and
based on the criterion, defining the flow of incoming packets from the plurality of packets.

15. The method of claim 14, wherein the property includes a source internet protocol address, a source port number, a destination internet protocol address, and a destination port number.

16. The method of claim 10, wherein said creating the plurality of virtual ports includes:

generating a plurality of hash buckets, wherein a hash bucket in the plurality of hash buckets is associated with the flow of incoming packets; and
creating the plurality of virtual ports to correspond to the plurality of hash buckets, including assigning the flow of incoming packets to the virtual port to which the flow of incoming packets is sent, and assigning the virtual port to which the flow of incoming packets is sent the egress port.

17. The method of claim 10, the detected network characteristic including at least one of network bandwidth or network traffic.

18. The method of claim 10, comprising sending the flow of incoming packets to the egress port.

19. The method of claim 10, comprising dropping the flow of incoming packets.

20. The method of claim 10, wherein said deciding the same forwarding treatment to be applied to each packet in the flow of incoming packets includes:
dynamically mapping the virtual port to which the flow to incoming packets is sent to the egress port, based on a network bandwidth associated with the egress port and a network traffic associated with the egress port.

21. The method of claim 10, comprising:
creating a static mapping between the virtual port to which the flow of incoming packets is sent and the egress port; and
upon said deciding the same forwarding treatment to be applied to each packet in the flow of incoming packets, based on the static mapping, forwarding the flow of incoming packets from the virtual port to which the flow of incoming packets is sent the egress port.

* * * * *